No. 687,909. Patented Dec. 3, 1901.
C. WACKER.
PROCESS OF COOKING AND EXTRACTING OIL FROM FISH.
(Application filed May 9, 1901.)
(No Model.) 2 Sheets—Sheet 1.
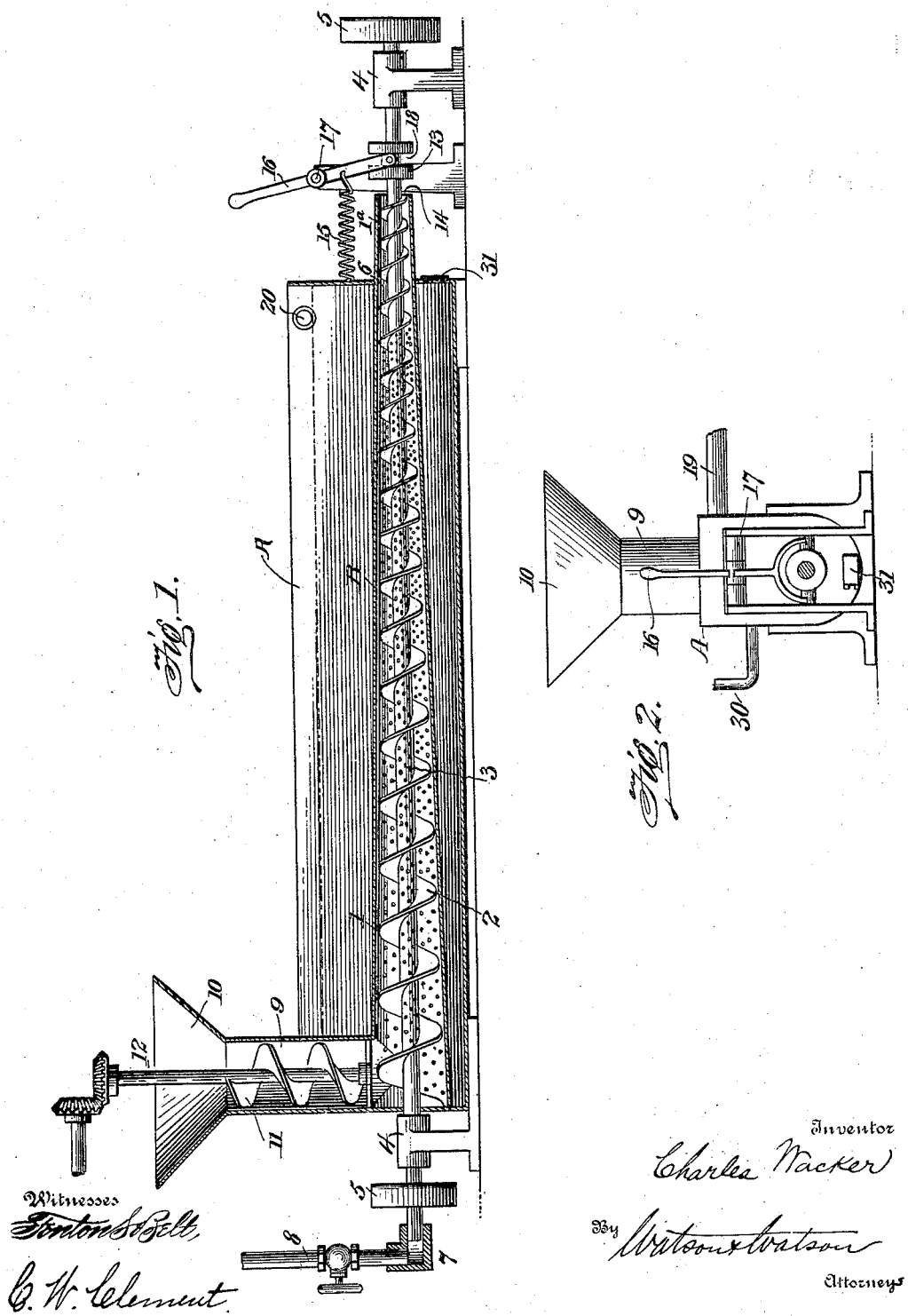
Witnesses
Fenton S. Belt,
C. W. Clement.
Inventor
Charles Wacker
By Watson & Watson
Attorneys

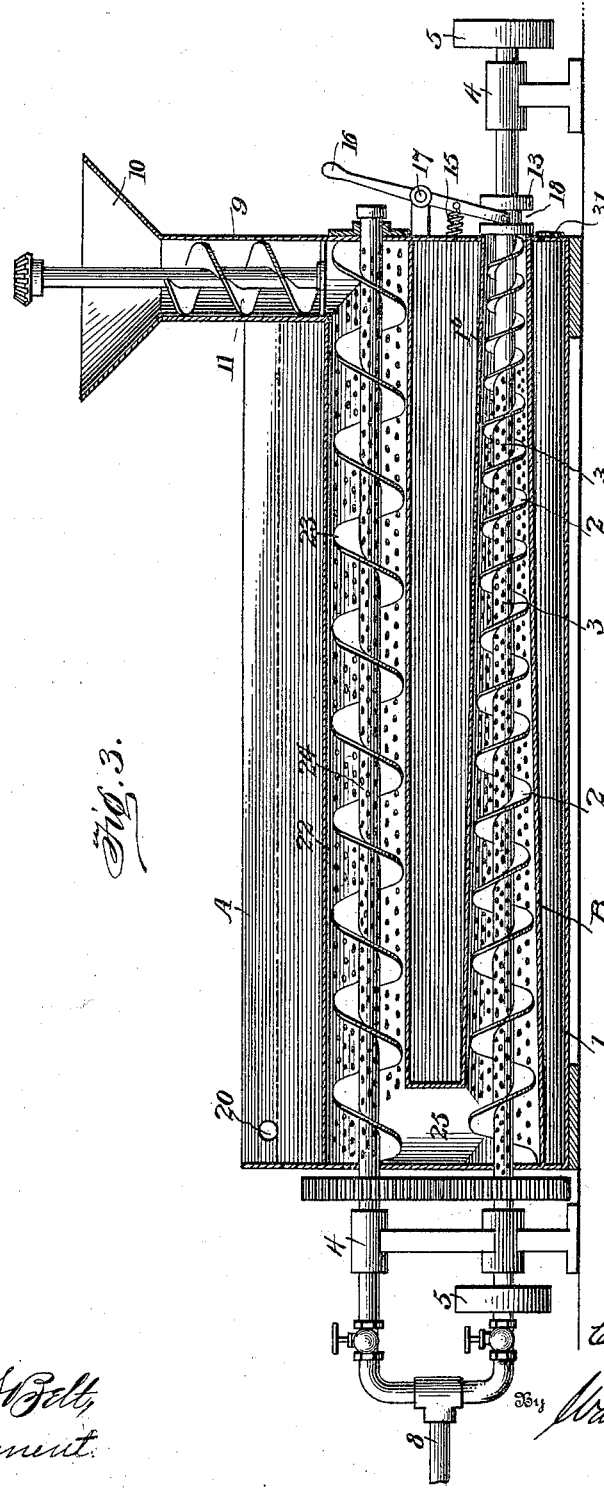

UNITED STATES PATENT OFFICE.

CHARLES WACKER, OF BALTIMORE, MARYLAND.

PROCESS OF COOKING AND EXTRACTING OIL FROM FISH.

SPECIFICATION forming part of Letters Patent No. 687,909, dated December 3, 1901.

Application filed May 9, 1901. Serial No. 59,392. (No specimens.)

*To all whom it may concern:*

Be it known that I, CHARLES WACKER, a citizen of the United States, residing at Baltimore, in the State of Maryland, have invented certain new and useful Improvements in Processes of Extracting Oil, of which the following is a specification.

This invention relates to a continuous process of extracting oil from fish or other material.

In carrying out the process means are provided for passing the material to be heated through a tank of heated liquid to cook the material and liberate the oil and for compressing the material during its passage through the liquid in order to express the oil. The oil after separation from the material floats to the top of the liquid and is conducted away, and the mass of material is expelled from the tank in a compressed state. The pressure applied to the material is preferably gradually increased as the material passes through the liquid, and steam in jets is injected into the interior of the mass in order to disintegrate and cook the material and also to heat the liquid.

The process may be used for treating raw material or material which has been previously partly or wholly cooked as well as for treating material from which a large part of the oil has been extracted by other processes. In the latter case the treated material may be subjected to the present process and the remaining oil extracted.

In the accompanying drawings, Figure 1 is a longitudinal section through one form of apparatus suitable for carrying out the process. Fig. 2 is a view of the delivery end of the tank shown in Fig. 1, and Fig. 3 is a longitudinal section through a modified form of apparatus.

Referring to Figs. 1 and 2 of the drawings, A indicates a tank or vessel made long and preferably narrow, as shown, and arranged longitudinally near the bottom of said tank is a conveyer-press B, comprising a tapering or conical casing 1, extending from end to end of the tank, and a correspondingly tapering screw 2, arranged within said casing and secured upon a shaft 3, the latter extending through the ends of the tank and being mounted in suitable bearings 4. Driving-wheels 5 are arranged upon the opposite ends of the shaft. The conical casing, as shown in Fig. 1, is perforated throughout its length in the interior of the tank, and its smaller end $1^a$ projects through an opening 6 in one end of the tank. The part $1^a$ is not perforated. The shaft 3, as shown in said figure, is made hollow and perforated throughout the portion lying within the tank, and steam is admitted to said shaft through the stationary coupling-piece 7, connected with the steam-pipe 8. A feed-pipe 9 is connected to the larger end of the conveyer-press casing and provided with a suitable hopper 10, and a screw-conveyer 11, mounted upon a vertical shaft 12, is arranged within said pipe and adapted to force the material to be treated down into the conveyer-press casing.

Upon the shaft 3 is arranged a sliding valve 13, which is adapted to fit over and close the discharge-opening 14 at the delivery end of the conveyer-press casing. This valve fits closely around the shaft and is movable longitudinally thereon, and it is normally pressed toward the opening 14 by a spring 15, attached to a lever 16, the latter being pivoted at 17 and having a forked end fitting within an annular recess 18, formed on the valve. When the tank is filled with water and the apparatus is not in operation, this valve closes the mouth of the conveyer-press casing and prevents the escape of water; but it may be withdrawn at any time by means of the handle 16. An opening 20 is formed near the top of the tank through which the oil which floats to the top of the water will pass off through a pipe 19. Water is supplied to the tank through an inlet-pipe 30 below the surface of the liquid.

In operation the fish or other matter is fed into the hopper 10 and is forced downward through the water into the conveyer-press casing by means of the conveyer 11. Steam is admitted to the hollow perforated shaft through the pipe 8, and the material under treatment is carried along by the screw 2, becoming gradually more compact as it passes toward the smaller end of the conveyer-press. Steam from the perforated shaft passes outward through the surrounding mass of material, heating the water and cooking and disintegrating the material. The tank is quite long, and the speed of the screw is regulated so as to allow plenty of time for the thorough cooking of the material before it reaches the delivery end of the casing. As the cooking and compressing process goes on the oil is liberated and floats to the top of the water, from whence it is continually skimmed off through the opening 18. In the larger end of the casing it will be seen that the compression of the material is slight and that the compression gradually increases as the material passes along toward the smaller end, where it forms a compact plug and prevents the escape of water. In the treatment of fish a large percentage of the oil may be liberated with little pressure when the fish is properly cooked by the hot water and steam. As oil and water do not mix, it is important to expel the oil as fast as it is liberated, so that the water can permeate the mass and come in contact with the portions of the material from which the oil has been liberated. By gradually compressing the fish under the heated water as the material passes along in the conveyer the oil is expelled as soon as it is liberated by the heat, and the hot water is allowed to come in contact with the parts from which it was previously excluded by the expelled oil. This gradual compression in the heated water therefore expels the oil as fast as it is liberated by the heat and hastens the cooking operation and the liberation of the remaining oil. Hence in passing through the screw-press the oil will be extracted before the material reaches the outlet end of the tube. The action with offal or other matter would be the same. When the material reaches the delivery end of the casing, it forms a compact plug which prevents the escape of water from the tank, and the pressure of the material upon the valve 13 forces the latter away from the end of the casing, so that the material may drop out. The valve will be held away from the mouth of the casing as long as the material is being forced through, and when the machine is out of operation the valve seats upon the end of the casing and prevents the escape of water from the tank.

In Fig. 3 is shown a modified form of apparatus in which the same result may be accomplished with a shorter tank, where space is limited, or in which the cooking operation may be prolonged before compression of the material if the tank is extended. In this figure a conveyer comprising a perforated cylinder 22 and a screw 23, mounted upon a perforated hollow shaft 24, the latter extending through the cylinder, is arranged in the upper portion of the tank. The feed-hopper 10 is arranged at one end of the cylinder, and a duct 25 is arranged at the opposite end, said duct leading to the larger end of the conveyer-press B in the lower part of the tank. This conveyer-press may be the same as that shown in Fig. 1; but in Fig. 3 it is shown with its smaller end cut off close to the end of the tank, the valve 13 fitting over the opening. When the conveyer-press is thus arranged, a portion $1^b$ of the smaller end of the casing adjacent to the end of the tank is preferably not perforated, as it is desirable to exclude the water from the material near its point of delivery in order to retain the water in the tank. The shafts of the upper and lower conveyers may be separately driven or geared together, as shown, and steam may be admitted to each shaft through a suitable supply-pipe 8. In the operation of this form of apparatus the material first passes along through the upper conveyer, where it is partially cooked, and thence into the conveyer-press in the bottom of the tank, where the operation of extracting the oil proceeds in the same manner as described in connection with Fig. 1.

While it is preferred to admit steam to the tank through the hollow shaft or shafts, the heat may be supplied in other ways—as, for instance, by means of steam-coils arranged within the tank. The shaft may be perforated for only a part of its length within the tank or throughout the whole distance, and the conical casing may likewise be perforated throughout or for a shorter length within the tank. Any suitable valve may be employed to close the smaller end of the casing; but a spring-pressed valve which will bear against the material and be opened thereby when the material is compressed sufficiently to force the valve off of its seat is preferred.

Any solid matter forced through the perforations in the casing will fall to the bottom of the tank, from whence it can be removed when necessary or desirable through a suitable drainage-opening 31. One trouble with compressing animal matter in the ordinary press exposed to the atmosphere is the clogging of the perforations in the press by the material which dries within and around the openings when the press is not in use. With the apparatus above described the perforations cannot become clogged, as the material is continually kept under water, where it cannot dry. Another advantage of the present process of extracting the oil is that if the material, particularly fish, is more or less decomposed and in a watery state the heating and gradual pressing under water liberates the oil in the manner described and any material forced through the openings will fall to the bottom, while the oil from such material will float to the top, whereas when the material is first cooked and then placed in an ordinary press the oil cannot be recovered, as the material in its decomposed and semifluid state cannot be compressed, but will be forced through the openings.

With suitable apparatus, such as that herein described, it will be seen that the process of extracting oil by compression and heat under water may be carried to completion continuously without rehandling and that the material is delivered from the apparatus in a compact mass, containing only a moderate amount of water.

Having thus described my invention, what I claim, and desire to secure by Letters Patent, is—

1. The herein-described continuous process of extracting oil which consists in passing the material from which oil is to be extracted through a heated liquid and compressing the material as it passes through the liquid.

2. The herein-described continuous process of extracting oil which consists in passing the material from which the oil is to be extracted through a heated liquid, and injecting steam into the interior of the mass and compressing the material as it passes through the liquid.

3. The herein-described continuous process of extracting oil which consists in passing the material from which the oil is to be extracted through a heated liquid and applying gradually-increasing pressure to the material as it passes through the liquid.

4. The herein-described continuous process of extracting oil which consists in passing the material from which the oil is to be extracted through a heated liquid, and injecting steam into the interior of the mass and applying gradually-increasing pressure to the material as it passes through the liquid.

5. The herein-described continuous process of extracting oil which consists in passing the material from which oil is to be extracted through hot water and compressing the material as it passes through the water.

In testimony whereof I affix my signature in presence of two witnesses.

CHARLES WACKER.

Witnesses:
  ROBERT WATSON,
  CHARLES H. MILLIKEN.

Correction in Letters Patent No. 687,909.

It is hereby certified that in Letters Patent No. 687,909, granted December 3, 1901, upon the application of Charles Wacker, of Baltimore, Maryland, in the grant and headings of the printed specification and drawings the title of the invention was erroneously written and printed " Processes of Cooking and Extracting Oil from Fish," whereas the said title should have been written and printed *Processes of Extracting Oil;* and that the said Letters Patent should be read with this correction therein that the same may conform to the record of the case in the Patent Office.

Signed, countersigned, and sealed this 31st day of December, A. D., 1901.

[SEAL.]

F. L. CAMPBELL,
*Assistant Secretary of the Interior.*

Countersigned:
   F. I. ALLEN,
      *Commissioner of Patents.*